US009672462B2

(12) United States Patent
Mlybari et al.

(10) Patent No.: US 9,672,462 B2
(45) Date of Patent: Jun. 6, 2017

(54) SMART SURFACE-MOUNTED HYBRID SENSOR SYSTEM, METHOD, AND APPARATUS FOR COUNTING

(71) Applicant: UMM AL-QURA UNIVERSITY, Makkah (SA)

(72) Inventors: Ehab Mlybari, Makkah (SA); Esam Yosry, Makkah (SA); Abdel-Rahman Hedar, Makkah (SA); Alaa E. Abdel-Hakim, Makkah (SA); Gamal Elsayed, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 0 days.

(21) Appl. No.: 15/053,644

(22) Filed: Feb. 25, 2016

(65) Prior Publication Data

US 2016/0258737 A1 Sep. 8, 2016

Related U.S. Application Data

(60) Provisional application No. 62/127,811, filed on Mar. 3, 2015.

(51) Int. Cl.
*G01J 5/00* (2006.01)
*G06M 1/00* (2006.01)

(52) U.S. Cl.
CPC .................................... *G06M 1/00* (2013.01)

(58) Field of Classification Search
CPC ......... G01C 22/06; G01S 11/14; G01S 11/12; G01S 5/186
See application file for complete search history.

(56) References Cited

U.S. PATENT DOCUMENTS 5,724,265 A * 3/1998 Hutchings ............ A43B 3/0005 235/105
5,899,963 A * 5/1999 Hutchings ............ A43B 3/0005 700/14

(Continued)

FOREIGN PATENT DOCUMENTS

| | | |
|---|---|---|
| EP | 0 992 949 A2 | 4/2000 |
| EP | 1 308 905 A1 | 10/2002 |
| JP | 2012-79140 | 4/2012 |

OTHER PUBLICATIONS

Kuutti, J., "A Test Setup for Comparison of People Flow Sensors", URL: http://lib.tkk.fi/Lic/2012/urn100598.pdf , Total 99 Pages, (Mar. 23, 2012).

*Primary Examiner* — Kiho Kim
(74) *Attorney, Agent, or Firm* — Oblon, McClelland, Maier & Neustadt, L.L.P.

(57) ABSTRACT

A counting system includes a counting apparatus, which includes a plurality of multi-sensor detectors configured to detect physical contact data and vertical range data corresponding to one or more steps across the multi-sensor detectors, and first circuitry configured to determine physical contact vectors and coordinate data from the physical contact data and the vertical range data. The counting system also includes at least one server including second circuitry configured to receive the physical contact vectors and the coordinate data from the counting apparatus, determine footprint patterns and body patterns based on the physical contact vectors and the coordinate data, and estimate a number of beings passing over the counting apparatus based on the footprint patterns and the body patterns.

20 Claims, 10 Drawing Sheets

(56) References Cited

U.S. PATENT DOCUMENTS

| | | | | | |
|---|---|---|---|---|---|
| 6,327,547 | B1 | 12/2001 | Shapira | | |
| 6,611,789 | B1 * | 8/2003 | Darley | ................. | A61B 5/1038<br>702/141 |
| 2008/0204223 | A1 * | 8/2008 | Chu | ..................... | G01C 22/006<br>340/539.13 |

* cited by examiner

SMART SURFACE-MOUNTED HYBRID SENSOR SYSTEM, METHOD, AND APPARATUS FOR COUNTING

CROSS-REFERENCE TO RELATED APPLICATIONS

The present application claims the benefit of the earlier filing date of U.S. provisional application 62/127,811 having common inventorship with the present application and filed in the U.S. Patent and Trademark Office on Mar. 3, 2015, the entire contents of which being incorporated herein by reference.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Earlier aspects and research studies have utilized both range and touch detectors to support multi-touch sensing. Combinations of different sensors are used in multi-touch screens and have been integrated for purposes such as controlling light emission/sensing in optical element displays. Some existing applications depend on spatial detection of small touching areas, like fingers, on very constrained surfaces by fully cooperative users. Certain applications also assume a limited number of simultaneously detected subjects, the cooperative behavior of such subjects, and the possibility of attaching sensors and transmitters to the subjects.

SUMMARY

In an exemplary embodiment, a counting system includes a counting apparatus, which includes a plurality of multi-sensor detectors configured to detect physical contact data and vertical range data corresponding to one or more steps across the multi-sensor detectors, and first circuitry configured to determine physical contact vectors and coordinate data from the physical contact data and the vertical range data. The counting system also includes at least one server including second circuitry configured to receive the physical contact vectors and the coordinate data from the counting apparatus, determine footprint patterns and body patterns based on the physical contact vectors and the coordinate data, and estimate a number of beings passing over the counting apparatus based on the determined footprint patterns and the determined body patterns.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
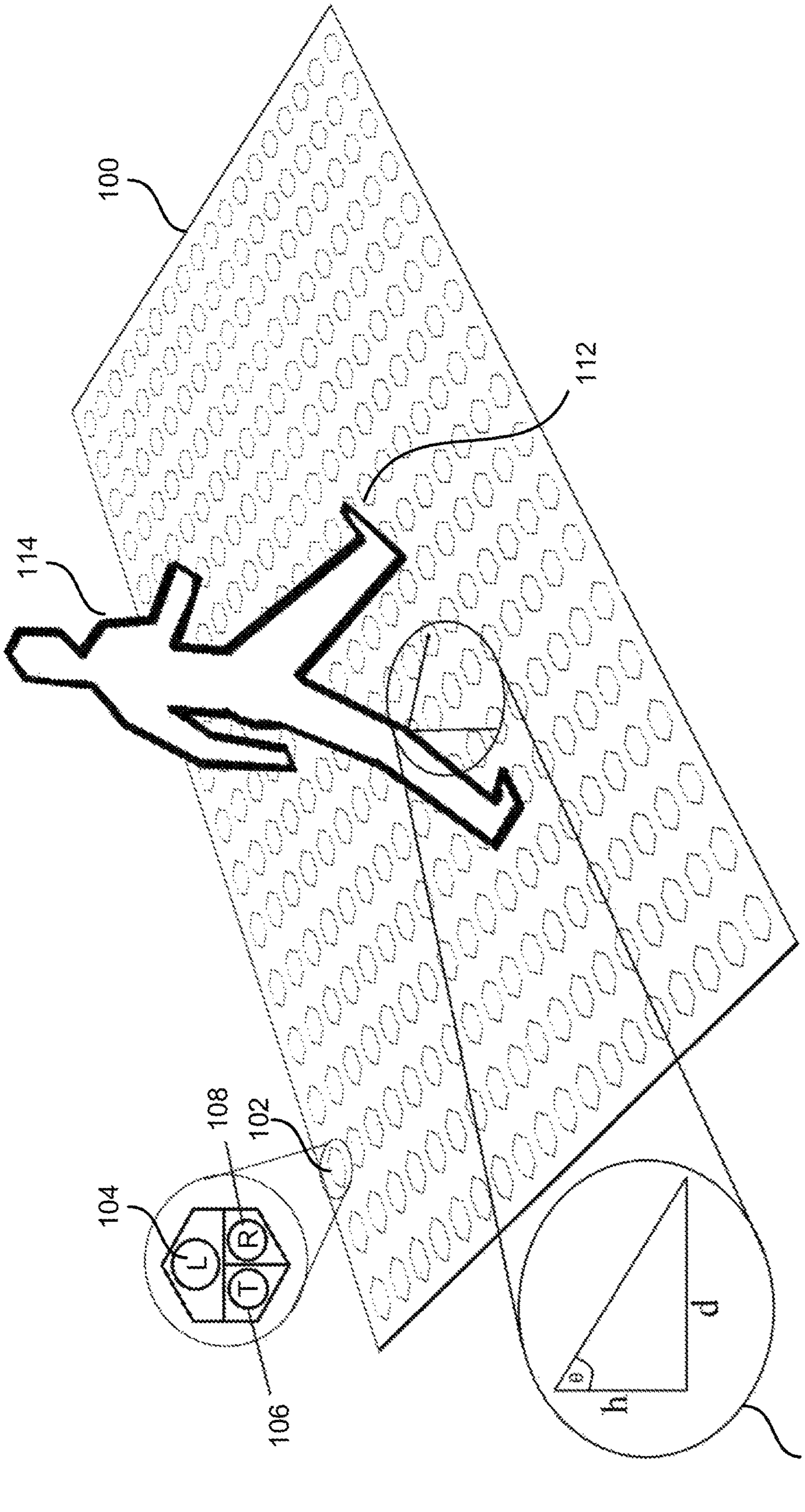
FIG. 1 is an exemplary illustration of a counting apparatus, according to certain embodiments.

In the drawings, like reference numerals designate identical or corresponding parts throughout the several views. Further, as used herein, the words "a," "an" and the like generally carry a meaning of "one or more" or "at least one," unless stated otherwise. Furthermore, the terms "approximately," "approximate," "about," and similar terms generally refer to ranges that include the identified value within a margin of 20%, 10%, or preferably 5%, and any values therebetween.

FIG. 1 is an exemplary illustration of a counting apparatus 100, according to certain embodiments. The counting apparatus 100 includes a plurality of multi-sensor detectors 102 configured to detect physical contact data and vertical range data corresponding to one or more steps across the multi-sensor detectors 102. In some embodiments, the multi-sensor detectors 102 include at least one light-emitting diode sensor (LED) 104 and at least one infrared (IR) transmitter 106 and at least one infrared (IR) receiver 108. The at least one LED 104 detects physical contact data while the at least one IR transmitter 106 and at least one IR receiver 108 detect vertical range data. For example, the physical contact data detected by the LED's 104 corresponds to footprints 112 taken across the counting apparatus 100. In certain embodiments, the LED's 104 detect footprints 112 taken across the counting apparatus 100 via a resistance switch, piezo touch switch, or any other physical contact detection apparatus of the like that would be known to one skilled in the art. In some implementations, the IR transmitter 106 sends a beam in a direction away from the counting apparatus 100 and the IR receiver 108 receives a reflection of the beam emitted by the IR transmitter 106. In certain embodiments, when the LED 104, IR transmitter 106 and IR receiver 108 operate in conjunction as a multi-sensor detector 102, the data obtained by the LED 104, IR transmitter 106 and IR receiver 108 may be utilized to form a set of coordinate data 110. In some embodiments, a set of coordinate data 110 corresponds to triangulation data based on the physical contact data such as distance (d) between detected physical contacts from the LED's 104 and vertical range data such as height (h) of the beam transmitted by the IR transmitter 106 and received by the IR receiver 108.

In some embodiments, the multi-sensor detectors 102 may be located predetermined distances away from one another within the counting apparatus 100 to account for varying degrees of predicted counts. In some embodiments, the multi-sensor detectors 102 in the counting apparatus 100 may be spaced closely together at a distance of 0.2-1 centimeters. Such a distance between multi-sensor detectors 102 may be implemented in locations and times with high subject density in the hundreds, thousands, tens of thousands, or the like such as airports on Monday morning, concert venues on Saturday nights, train stations on weekdays around 5 PM, etc. In other embodiments, the multi-sensor detectors 102 in the counting apparatus 100 may be spaced further apart from one another at a distance of 1-10 centimeters. Such a distance between multi-sensor detectors 102 may be implemented in locations with low density of less than 100 subjects such as classrooms in schools on weekday mornings, conference rooms at companies after lunch, etc.

Figure 2:
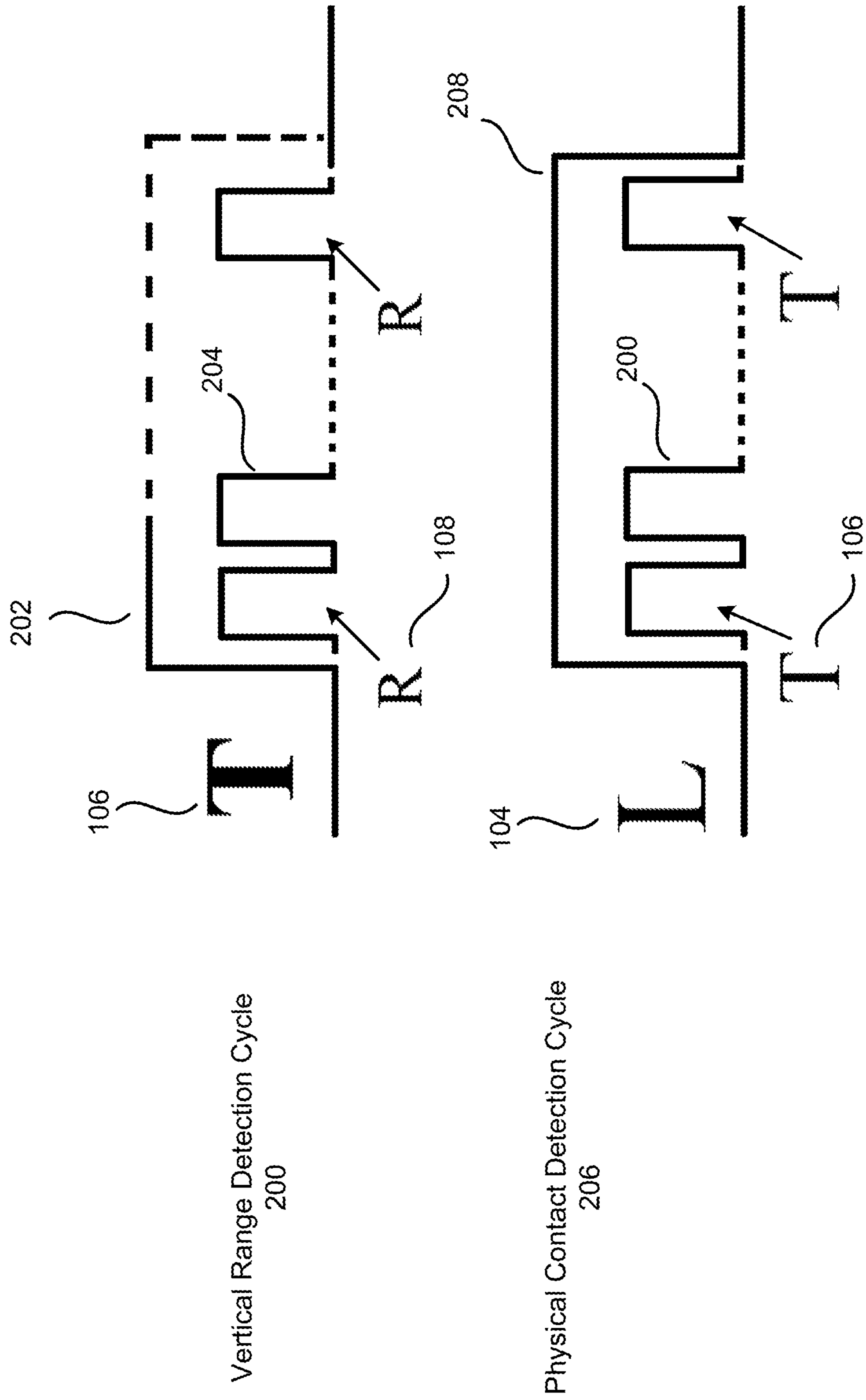
FIG. 2 is an exemplary illustration of multi-sensor detection cycles, according to certain embodiments.

FIG. 2 is an exemplary illustration of multi-sensor detection cycles, according to certain embodiments. In some embodiments, the multi-sensor detection cycles include a vertical range detection cycle 200 and a physical contact detection cycle 206. In certain embodiments, the vertical range detection cycle 200 includes a vertical beam emitted by the IR transmitter (T) 106. The vertical beam emitted by the IR transmitter 106 is detected by the IR receiver (R) 108 in a scanning pattern such that at least one vertical beam is transmitted during each vertical range detection cycle 200. As such, the IR transmitter 106 sends a vertical beam upwards in a direction away from the counting apparatus 100 during a high level 202 of the vertical range detection cycle 200. The IR receiver 108 then receives a reflected beam 204 and a time of flight response is detected for each corresponding reflected beam 204. If the time of flight response, which is the time between the transmission and reception of the beam, is less than a predetermined threshold, the vertical range data from each reflected beam 204 in the vertical range detection cycle 200 is processed by circuitry in the counting apparatus 100. In some embodiments, the counting apparatus 100 may include circuitry configured to collect the vertical range data and physical contact data received by vertical range detection cycles 200 and physical contact detection cycles 206. Any processing performed by circuitry in the counting apparatus 100 can also be performed by a server 302. The implementation of the server 302 and its corresponding processing circuitry in the counting system 300 will be described further herein. In certain embodiments, the counting apparatus 100 may contain a local memory for storing the vertical range data and physical contact data.

In some embodiments, the vertical range detection cycle 200 is synchronized with a physical contact detection cycle 206. The physical contact detection cycle 206 includes physical contact data obtained by the LED's 104 which may be linked to the vertical range data detected during the vertical range detection cycle 200. The physical contacts, such as footprints 112, are detected by the LED's 104 during a high level 208 of the physical contact detection cycle 206. In certain embodiments, the vertical range data and the physical contact data are collected by local circuitry in the counting apparatus 100 to determine coordinate data 110 from the vertical range detection cycles 200 and the physical contact detection cycles 206. The local circuitry in the counting apparatus 100 may process the vertical range data and physical contact data to generate the at least one set of coordinate data 110.

Figure 3:
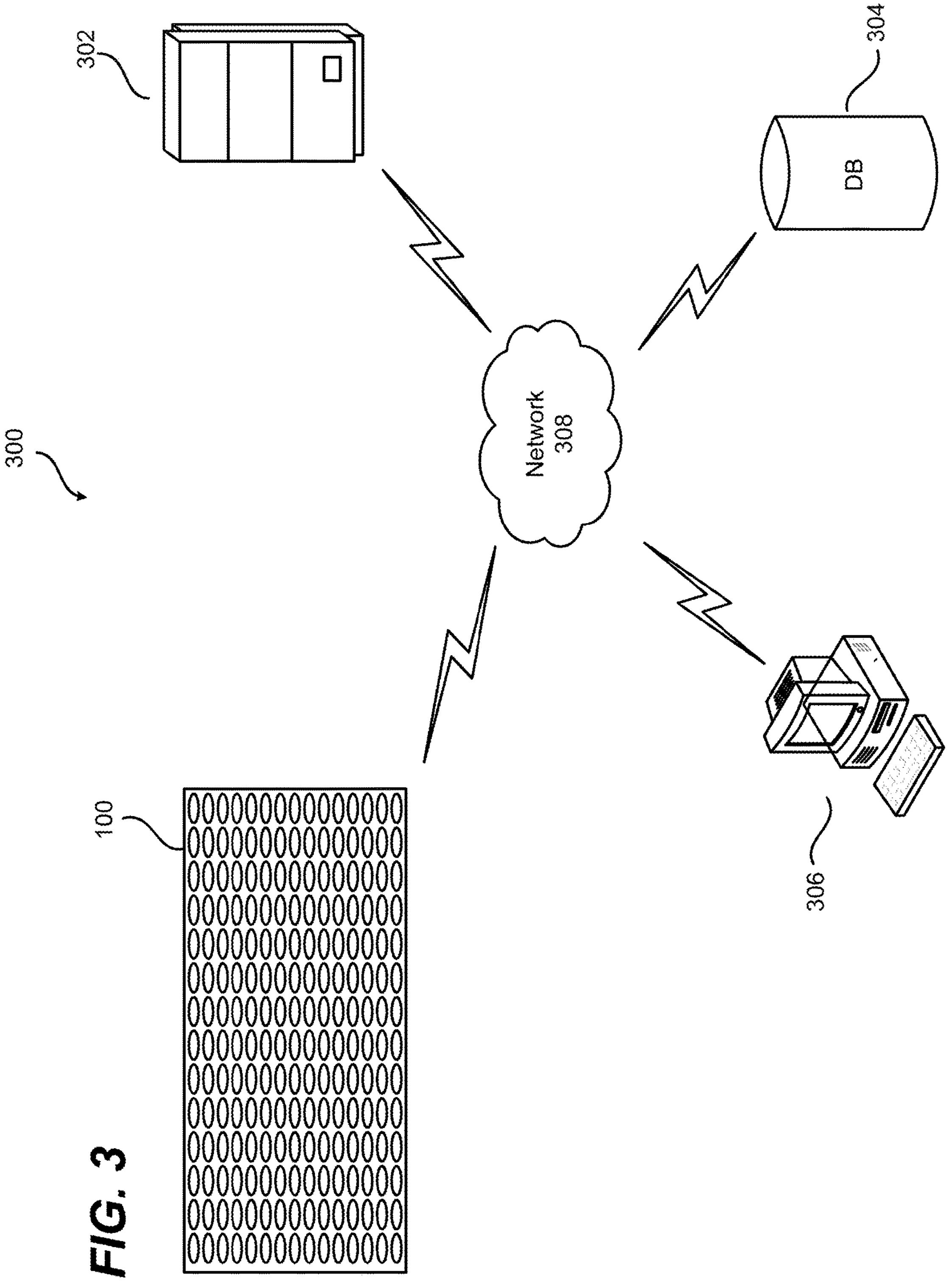
FIG. 3 illustrates an exemplary counting system, according to certain embodiments.

FIG. 3 illustrates an exemplary counting system 300, according to certain embodiments. The counting apparatus 100 is connected to a network 308, which is connected to a server 302, database (DB) 304, and computer 306. The computer 306 acts as a client device that is connected to the counting apparatus 100, the server 302 and the database 304 via the network 308. The server 302, also referred to as the count estimation device, represents at least one server 302 connected to the counting apparatus 100, the database 304 and computer 306 via the network 308. The database 304 represents one or more databases connected to the counting apparatus 100, the computer 306 and the server 302 via the network 308. In certain embodiments, at least one database 304 is a local database configured to store coordinate data 110 and physical contact vectors 400 obtained via local circuitry in the counting apparatus 100. In some embodiments, the coordinate data 110 and physical contact vectors 400 are stored in a remote database 304 in communication with the counting apparatus 100. Details regarding processes associated with the collection of physical contact vectors 400 will be described further herein. The network 308 represents one or more networks 308, such as the Internet, which is configured to connect the counting apparatus 100, the server 302, the database 304 and the computer 306.

In some embodiments, the counting apparatus 100 can transmit the coordinate data 110 and physical contact vectors 400 to the server 302, the database 304 and the computer 306 via the network 308 through a wired or wireless connection. The server 302 includes processing circuitry that is configured to determine footprint patterns 402 and body patterns 500 via machine learning techniques based on the coordinate data 110 and physical contact vectors 400. In some aspects, the footprint pattern 402 may be a 2D footprint pattern. In certain aspects, a 2D footprint pattern 402 corresponds to the footprint 112 of a being moving across the counting apparatus 100. In some embodiments, the being may correspond to a human, an animal and the like. In certain aspects, a 3D body pattern 500 corresponds to the body of a being moving across the counting apparatus 100. The 2D footprint patterns 402 and 3D body patterns will be described further herein.

The processing circuitry of the server 302 can estimate the number of beings passing over the counting apparatus 100 based on the coordinate data 110 and physical contact vectors 400. In some embodiments, the server 302 can detect individual footprints 112 that contact the counting apparatus 100. The server 302 can also determine the instantaneous number of footprints 112 stepping across the counting apparatus 100. For example, the counting apparatus 100 can determine the instantaneous number of footprints 112 that come into contact with the counting apparatus 100 over a time frame of 0-10 milliseconds. The server 302 can also determine the accumulative number of footprints 112 stepping across the counting apparatus 100 over a predetermined period of time. For example, the counting apparatus 100 may determine the accumulative number of footprints 112 that came into contact with the counting apparatus 100 over a time frame of several hours, a single day, several days, etc.

In some aspects, the server 302 can determine the instantaneous number of bodies 114 moving across the counting apparatus 100 based on the determined 2D footprint patterns 402. For example, the counting apparatus 100 may determine the instantaneous number of bodies 114 moving across the counting apparatus 100 over a time frame of 0-10 milliseconds. The server 302 can also determine the accumulative number of bodies 114 moving over the counting apparatus 100 over a predetermined period of time. For example, the counting apparatus 100 may determine the accumulative number of bodies 114 moving across the counting apparatus 100 over a time frame of several hours, a single day, several days, etc. In some embodiments, the accumulative and/or instantaneous footprint 112 and/or body 114 data may be stored in a database 304 for further processing and/or data trend analysis. Such processing and/or data trend analysis may include: determining at what points in the day the counting apparatus 100 is most populated with bodies 114, detecting which days the counting apparatus 100 is most stepped on, determining what the greatest number of footprints 112 detected in a single day is, etc.

In some embodiments, the counting apparatus 100 can be equipped with circuitry to communicate via wireless networks such as Wi-Fi, Bluetooth, cellular networks including EDGE, 3G and 4G wireless cellular systems, or any other wireless form of communication that is known. In certain embodiments, the detection of a footprint 112 and/or body 114 may be timestamped corresponding to the time of communication of wireless network access points, cellular tower, and the like.

Figure 4:
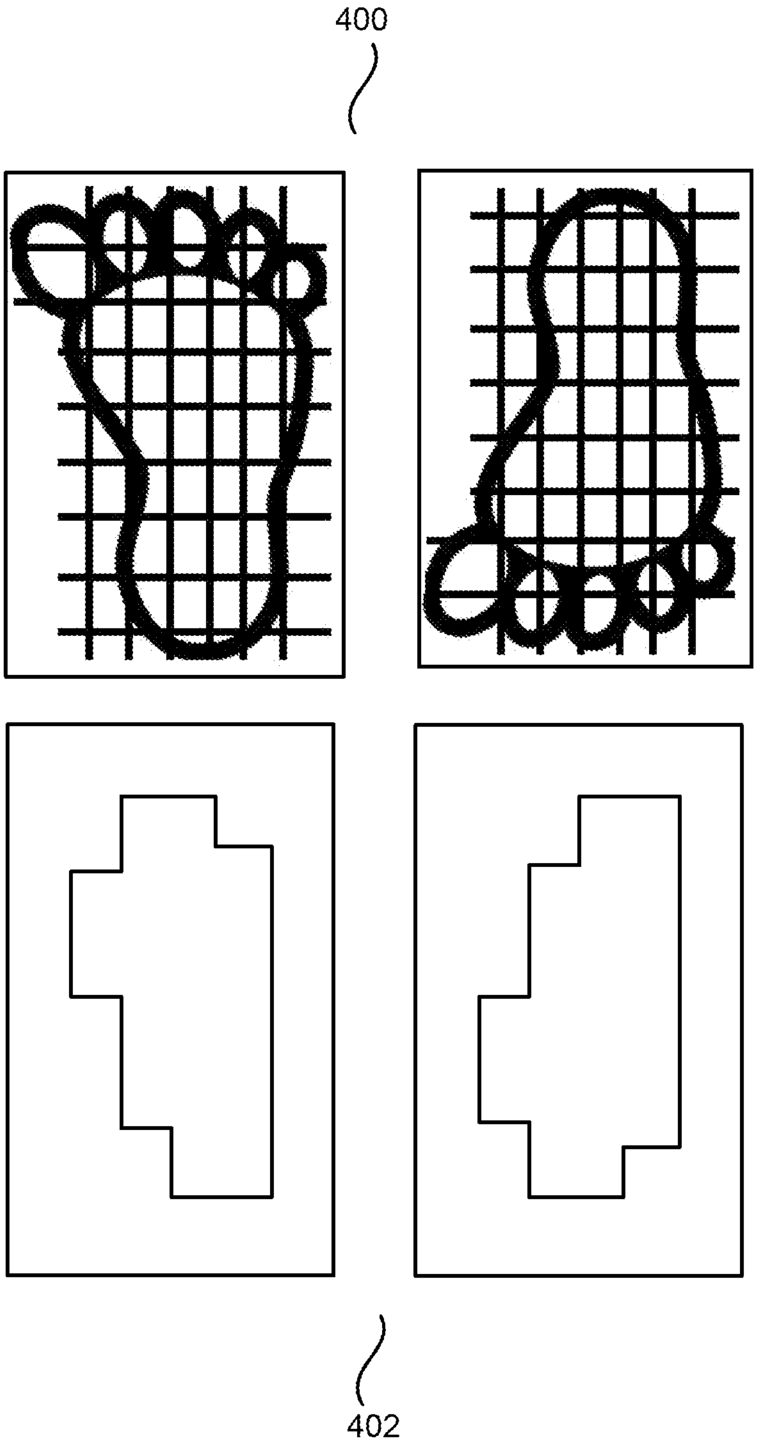
FIG. 4 is an exemplary illustration of a footprint pattern, according to certain embodiments.

FIG. 4 is an exemplary illustration of a footprint pattern 402, according to certain embodiments. In some aspects, the footprint pattern 402 may be a 2D footprint pattern and the body pattern 500 may be a 3D body pattern. In certain embodiments, the 2D footprint pattern 402 is determined by a physical contact vector 400 and coordinate data 110, which are detected via the plurality of multi-sensor detectors 102. The physical contact vector 400 and coordinate data 110 may be stored in a local database associated with the counting apparatus 100. The local circuitry in the counting apparatus 100 transmits the physical contact vector 400 and coordinate data 110 detected by the LED's 104 and IR transmitter 106 and IR receiver 108 pairs to the server 302. In some embodiments, the server 302 can determine the 2D footprint pattern 402 including information such as the footprint 112 size, footprint 112 direction, step size (the distance between footprints 112), etc. as a result of the coordinate data 110 and the physical contact vector 400. The determined information such as footprint 112 size, footprint 112 direction, step size, etc. may be stored in a database 304 for further processing and/or data trend analysis.

Figure 5:
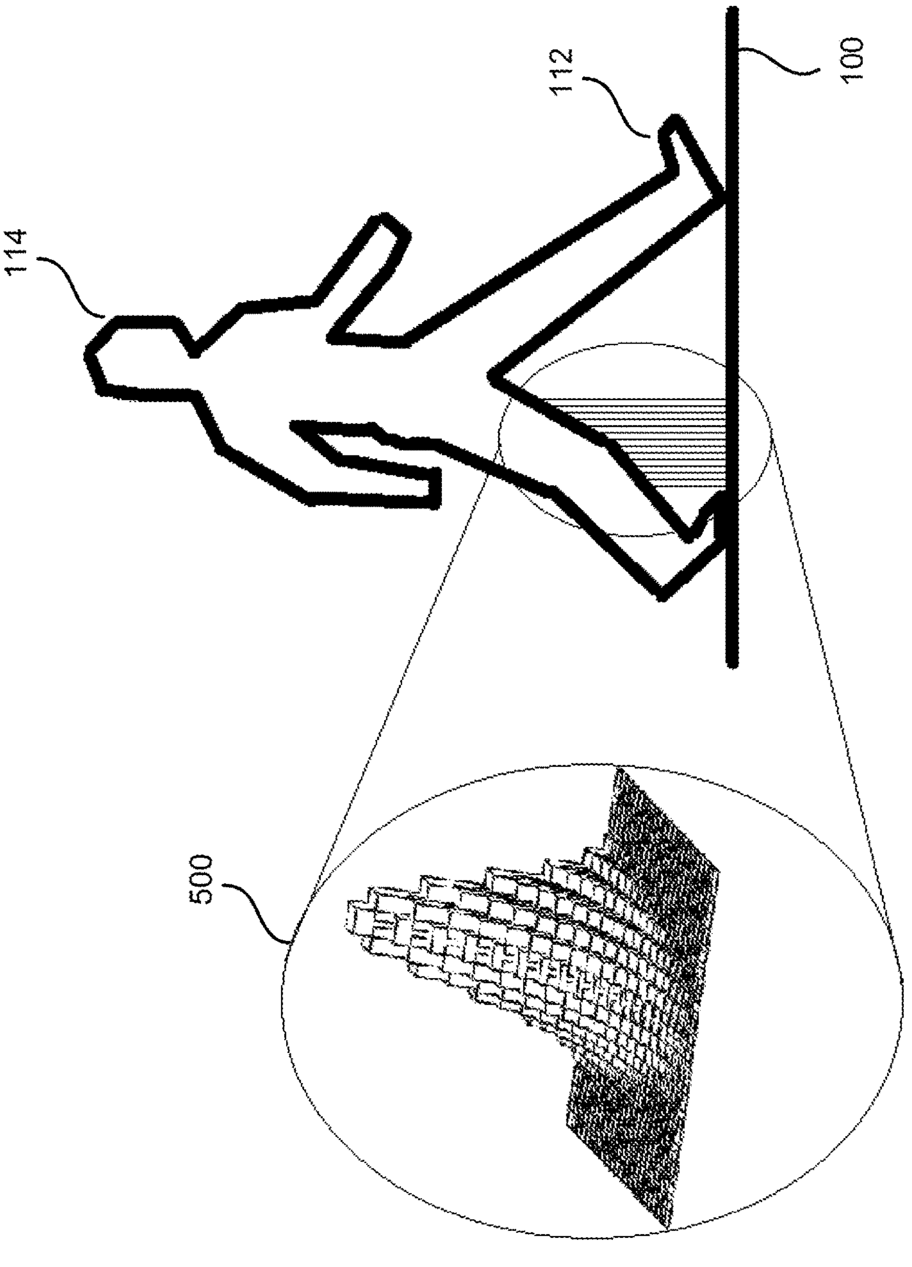
FIG. 5 is an exemplary illustration of a body pattern, according to certain embodiments.

FIG. 5 is an exemplary illustration of a body pattern 500, according to certain embodiments. In some aspects, the body pattern 500 may be a 3D body pattern. In certain embodiments, the processing circuitry of the server 302 utilizes 2D footprint patterns 402 corresponding to beings stepping across the counting apparatus 100 and coordinate data 110 to represent the 3D body patterns 500. The 3D body patterns 500 are measured as a result of the data collected by the multi-sensor detection cycles in FIG. 2 and the detection of 2D footprint patterns 402. The 2D footprint patterns 402 and coordinate data 110 can be used to create 3D body patterns 500. In some embodiments, 3D body patterns 500 are created for the entire area of the counting apparatus 100 and are transmitted to the server 302 via the network 308 through a wired or wireless connection.

In some embodiments, the server 302 uses machine learning techniques on cases of body patterns 500 and footprint patterns 402 to determine a state for each detected case. In certain embodiments, several possible states exist for each detected case with regard to the following combinations of body patterns 500 and footprint patterns 402: a footprint pattern 402 with a body pattern 500; multiple footprint patterns 402 with a body pattern 500; a body pattern 500 with no footprint patterns 402; and interfering body patterns 500 with multiple footprint patterns 402. As such, the processing circuitry of the server 302 utilizes machine learning techniques to estimate counts using the cases of these states including body patterns 500 and footprint patterns 402. In some embodiments, the footprint pattern 402 may be a 2D footprint pattern and the body pattern 500 may be a 3D body pattern.

For example, in one state, the processing circuitry of the server 302 uses machine learning techniques to determine a single body 114 count from a single 2D footprint pattern 402 and a single 3D body pattern 500. In the state, the single 2D footprint pattern 402 and single 3D body pattern 500 correspond to a single body 114 position on the counting apparatus 100. In certain embodiments, the correlation between a particular 3D body pattern 500 and a particular 2D footprint pattern 402 may yield a single data point which corresponds to a being moving across the counting apparatus 100.

In another state, the processing circuitry of the server 302 uses machine learning techniques to determine a single body 114 count from multiple 2D footprint patterns 402 and a 3D body pattern 500. In the state, the multiple 2D footprint patterns 402 and a 3D body pattern 500 may correspond to a single body 114 position on the counting apparatus 100. In some embodiments, the correlation between a particular 3D body pattern 500 and a plurality of 2D footprint patterns 402 may yield a single data point which corresponds to a being moving across the counting apparatus 100.

In another state, the processing circuitry of the server 302 uses machine learning techniques to determine a single body 114 count from a 3D body pattern 500 with no 2D footprint patterns 402. In the state, the 3D body pattern with no 2D footprint patterns 402 corresponds to a single body 114 position on the counting apparatus 100. In certain embodiments, the correlation between a particular 3D body pattern 500 and no detected 2D footprint pattern 402 may yield a single data point which corresponds to a being moving across the counting apparatus 100.

In another state the processing circuitry of the server 302 uses machine learning techniques to determine multiple counts from multiple 3D body patterns 500 and multiple 2D footprint patterns 402. In the state, the multiple 3D body patterns 500 and multiple 2D footprint patterns 402 correspond to the body 114 positions of a plurality of beings on the counting apparatus 100. In certain embodiments, the correlation between multiple 3D body patterns 500 and multiple 2D footprint patterns 402 may yield multiple data points which correspond to a being moving across the counting apparatus 100. As such, data points determined for each possible state of the different cases may be stored in a database 304 for future reference. In some embodiments, the processing circuitry may be configured to utilize the data points from the determined states to calculate counts, analyze count trends, determine if a presently detected being preexists in the database 304, and the like.

The processing circuitry of the server 302 may utilize different types of machine learning techniques such as artificial neural networks, deep learning, genetic programming, metaheuristic programming, etc. For example, the machine learning techniques may be used to estimate functions regarding trends in counting throughout various points of the day or various points in the week, to recognize familiar 3D body patterns 500 for future use, storage and analysis, to optimize the processing power of local circuitry in the counting apparatus 100 in which the multi-sensor detectors 102 may only be powered "on" at specific points during the day when beings are present, and the like. In certain aspects, the proposed machine learning techniques may be utilized by the server 302 to determine counts from 3D body pattern(s) 500 and/or 2D footprint patterns 402. In some embodiments, the counts may include any combination of humans, animals and the like.

Figure 6:
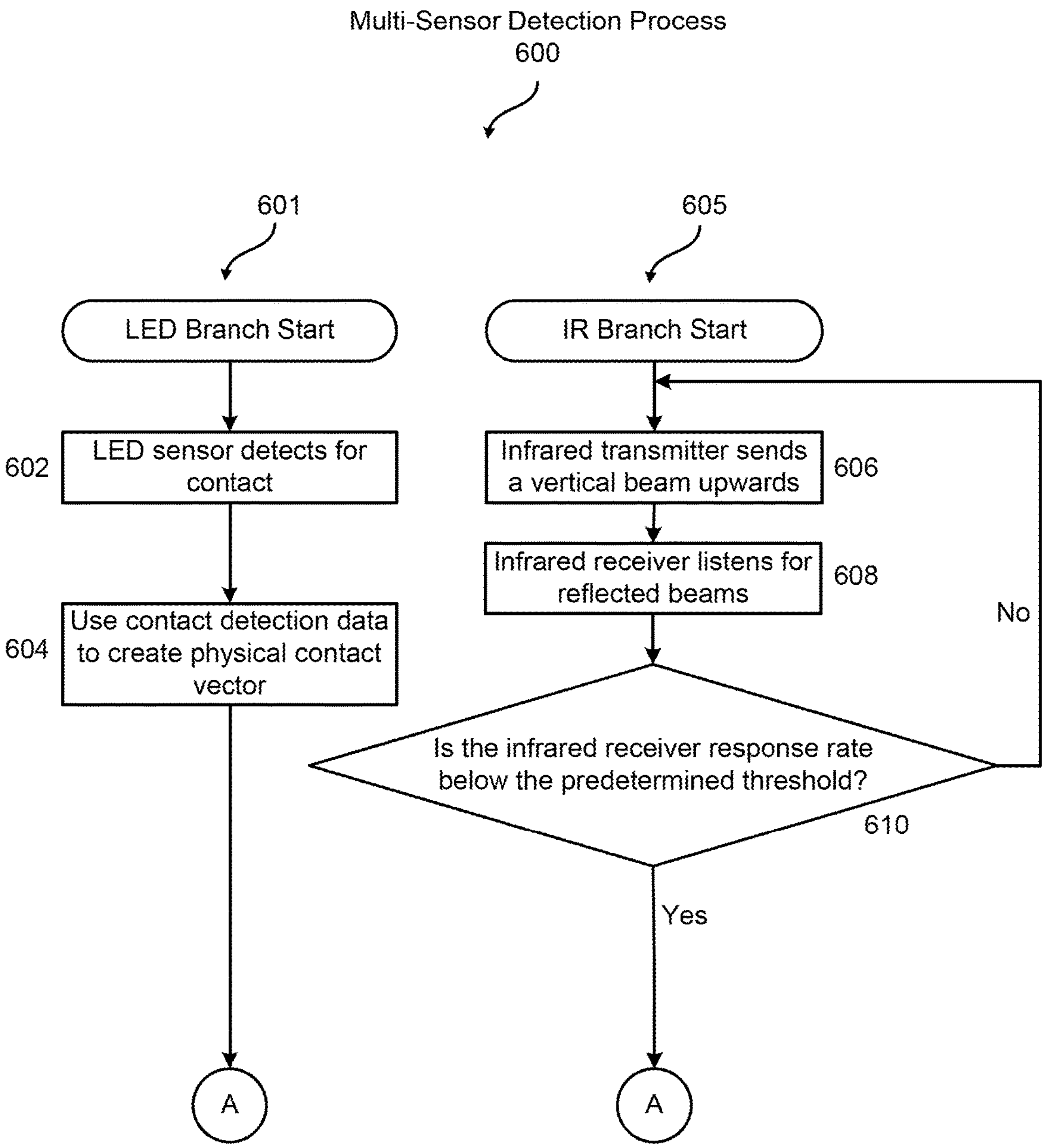
FIG. 6 illustrates an exemplary flowchart for a multi-sensor detection process, according to certain embodiments.

FIG. 6 illustrates an exemplary flowchart for a multi-sensor detection process 600, according to certain embodiments. The multi-sensor detection process 600 includes a LED branch 601 and an IR branch 605 that correspond to processes associated with obtaining sensor data from the LED sensor 104 and/or the IR transmitter 106 and IR receiver 108 pair, respectively. The steps of the LED branch 601 and the IR branch 605 can be performed in parallel or in series.

At step 602, the LED sensor 104 detects physical contact. In some implementations, the multi-sensor detectors 102 may exist within the counting apparatus 100. In some implementations, the multi-sensor detectors 102 may also include a pressure sensor, position sensor detector, or the like. As the footprints 112 come into physical contact with the LED's 104, physical contact data is collected by each of the LED's 104. In certain embodiments, the LED's 104 detect footprints 112 taken across the counting apparatus 100 via a resistance switch, piezo touch switch, or any other physical contact detector of the like.

At step 604, local circuitry collects physical contact data from the LED's 104 to create the physical contact vectors 400. For example, the physical contact data detected by the LED's 104 creates the physical contact vectors 400 which correspond to footprints 112 taken across the counting apparatus 100. In certain embodiments, the physical contact vector 400 corresponds to a single scan of data collection performed by the LED's 104 located in the counting apparatus 100. In certain embodiments, the physical contact vector 400 data is stored in a local database in communication with the counting apparatus 100.

At step 606, the IR transmitter 106 sends at least one vertical beam upwards. In certain embodiments, the IR transmitter 106 sends vertical beams upwards for a predetermined period of time at a predetermined frequency. For example, the vertical beam is sent in a direction away from the counting apparatus 100 towards bodies 114 above the counting apparatus 100, the beam is reflected off of the bodies 114, and then the beam is directed vertically downwards in the direction of the at least one IR receiver 108.

At step 608, the IR receiver 108 receives reflected beams originally transmitted by the IR transmitter 106. In some embodiments, the IR receiver 108 receives reflected beams over a predetermined period of time. The predetermined period of time includes a predetermined number of vertically upward beams transmitted in a direction away from the counting apparatus 100 via the IR transmitter 106.

At step 610, a determination is made of whether the IR receiver 108 has received at least one reflected beam with a response rate that is less than, equal to, or greater than the predetermined response rate threshold. If the IR receiver 108 has received a response rate that is less than the predetermined response rate threshold, and consequently results in a "yes" at step 610, the multi-sensor detection process 600 will proceed to the counting process 700. Otherwise, if the IR receiver 108 has received a response rate that is equal to or greater than the predetermined response rate threshold, resulting in a "no" at step 610, then the multi-sensor detection process 600 will restart and proceed to step 606.

Figure 7:
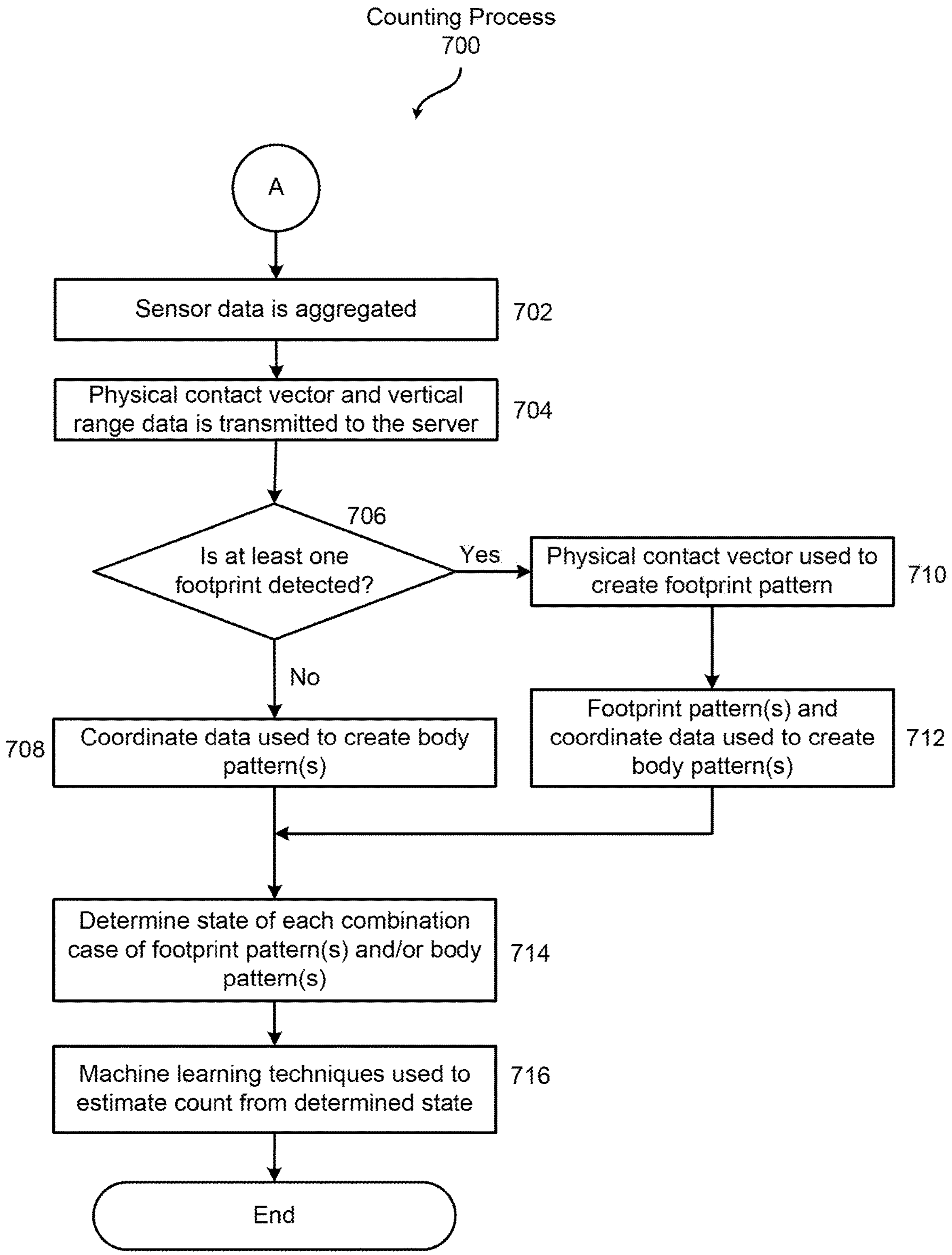
FIG. 7 illustrates an exemplary flowchart for a counting process, according to certain embodiments.

FIG. 7 illustrates an exemplary flowchart for a counting process 700, according to certain embodiments. At step 702, the data from the multi-sensor detection process 600 is aggregated by local circuitry in the counting apparatus 100. In an aspect, the data from the multi sensor detection process 600 may be aggregated by processing circuitry of the server 302. In some embodiments, the aggregated data from the multi-sensor detection process 600 includes physical contact data collected by the LED's 104 and vertical range data collected by the IR transmitter 106 and IR receiver 108 pair. In certain embodiments, the aggregated data may be stored in local memory of the counting apparatus 100. In some embodiments, the multi-sensor detectors 102 include uniquely identifiable information so that the detection data received by each multi-sensor detector 102 may be organized when aggregated. As such, each multi-sensor detector 102 may be given a serial number so that when the data is aggregated and timestamped, by the local circuitry of the counting apparatus 100, each individual multi-sensor detector's 102 respective physical contact data and vertical range data may be referenced directly in the local database via the serial number. In certain embodiments, local circuitry of the counting apparatus 100 is configured to use the aggregated data to determine the physical contact vectors 400 and the coordinate data 110 from the physical contact data and vertical range data.

At step 704, the aggregated multi-sensor detection data 702 including the physical contact vectors 400 and coordinate data 110 are transmitted to the server 302. In certain embodiments, the physical contact vectors 400 and the coordinate data 110 are transmitted from the counting apparatus 100 to the server 302 via a wired or wireless connection. In certain embodiments, the physical contact vectors 400 and the coordinate data 110 are sent at predetermined time intervals. For example, the physical contact vectors 400 and coordinate data 110 may be transmitted to the server 302 every 12 hours, 24 hours, and the like. In other embodiments the physical contact vectors 400 and the coordinate data 110 are sent at predetermined points in time. For example, the physical contact vectors 400 and coordinate data 110 may be transmitted to the server 302 at specific times throughout the day such as 8 AM, 2 PM, 5 PM and the like. In other embodiments, the physical contact vectors 400 and the coordinate data 110 are sent when the memory of the counting apparatus 100 is full. In certain embodiments, the physical contact vectors 400 and the coordinate data 110 are sent when the density of contact points in the physical contact vector 400 reaches a predetermined threshold of detected contacts.

At step 706, the server 302 receives the physical contact vectors 400 and the coordinate data 110 from the counting apparatus 100. In some embodiments, the processing circuitry of the server 302 determines whether at least one 2D footprint pattern 402 is detected. The server 302 may determine that at least one 2D footprint pattern 402 is detected when the number of non-zero entries of the physical contact vector 400 is greater than a predetermined threshold. If the server 302 does not detect at least one 2D footprint pattern 402, resulting in a "no" at step 706, then the counting process 700 will proceed to step 708. Otherwise, if the server 302 detects at least one 2D footprint pattern 402, resulting in a "yes" at step 708, the counting process 700 will proceed to step 710.

At step 708, the sets of coordinate data 110 are used to create the 3D body patterns 500 when no footprints 112 are detected. In certain embodiments, duplicate 3D body patterns 500 can be recognized by processing circuitry of the server 302 via machine learning techniques. In some embodiments, 3D body patterns 500 can be determined with no footprint 112 information or detection.

At step 710, the physical contact vectors 400 are utilized to create at least one 2D footprint pattern 402. In some embodiments, the 2D footprint patterns 402 span the entire area of the counting apparatus 100. In certain embodiments, duplicate 2D footprint patterns 402 can be recognized by processing circuitry of the server 302 via machine learning techniques. The circuitry of the server 302 may utilize different types of machine learning techniques such as artificial neural networks, deep learning, genetic programming, metaheuristic programming, etc. For example, the machine learning techniques may be used to estimate functions regarding trends in counting throughout various points of the day or various points in the week, to recognize familiar 3D body patterns 500 for future use, storage and analysis, to optimize the processing power of local circuitry in the counting apparatus 100 in which the multi-sensor detectors 102 may only be powered "on" at specific points during the day when beings are present, or the like. In certain aspects, the proposed machine learning techniques may be utilized by processing circuitry of the server 302 to determine counts from 3D body pattern(s) 500 and/or 2D footprint pattern(s) 402. In some embodiments, the counts may include any combination of humans, animals and the like.

At step 712, the 2D footprint patterns 402 are used in combination with the coordinate data 110 to create the 3D body patterns 500. In certain embodiments, a specific being can be determined from the combination of a 2D footprint pattern 402 and a 3D body pattern 500. The data may be stored and accessed in a database 304 so that trends and patterns may be recognized within the detected 2D footprint patterns 402 and 3D body patterns 500.

At step 714, the server 302 determines the state of each case of 2D footprint pattern(s) 402 and/or 3D body pattern(s) 500. In some embodiments, several states exist with regard to the following combinations of 3D body patterns 500 and 2D footprint patterns 402: a 2D footprint pattern 402 with a 3D body pattern 500; multiple 2D footprint patterns 402 with a 3D body pattern 500; a 3D body pattern 500 with no 2D footprint patterns 402; and interfering 3D body patterns 500 with multiple 2D footprint patterns 402. As a result, the processing circuitry of the server 302 determines the corresponding state of each case.

At step 716, processing circuitry of the server 302 estimates the count as a result of the determined states of the cases. In certain embodiments, the server 302 estimates the number of instantaneous beings moving across the counting apparatus 100 at a predetermined time. For example, the server 302 can determine the instantaneous number of beings that are moving across the counting apparatus 100 over a time frame of 0-10 milliseconds. In some embodiments, the server 302 estimates the number of accumulative beings moving across the counting apparatus 100 over a predetermined span of time. For example, the server 302 may determine the accumulative number of beings that moved across the counting apparatus 100 over a time frame of several hours, a single day, several days, etc.

Counting at bottleneck locations via the counting apparatus 100 can be used in several applications including but not limited to: crowd management, the organization and control of mass gatherings such as festivals, athletic events, airports, and pilgrimage, controlling risks of overcrowding such as stampedes, suffocation, and the like. The present disclosure addresses counting problems under unconstrained conditions with fully uncontrolled and non-cooperative subjects. The present disclosure also takes underlying issues into consideration, such as real time counting. The proposed system is an automated system that can count beings in various gathering places and events regardless of the crowd size and their cooperation.

Figure 8:
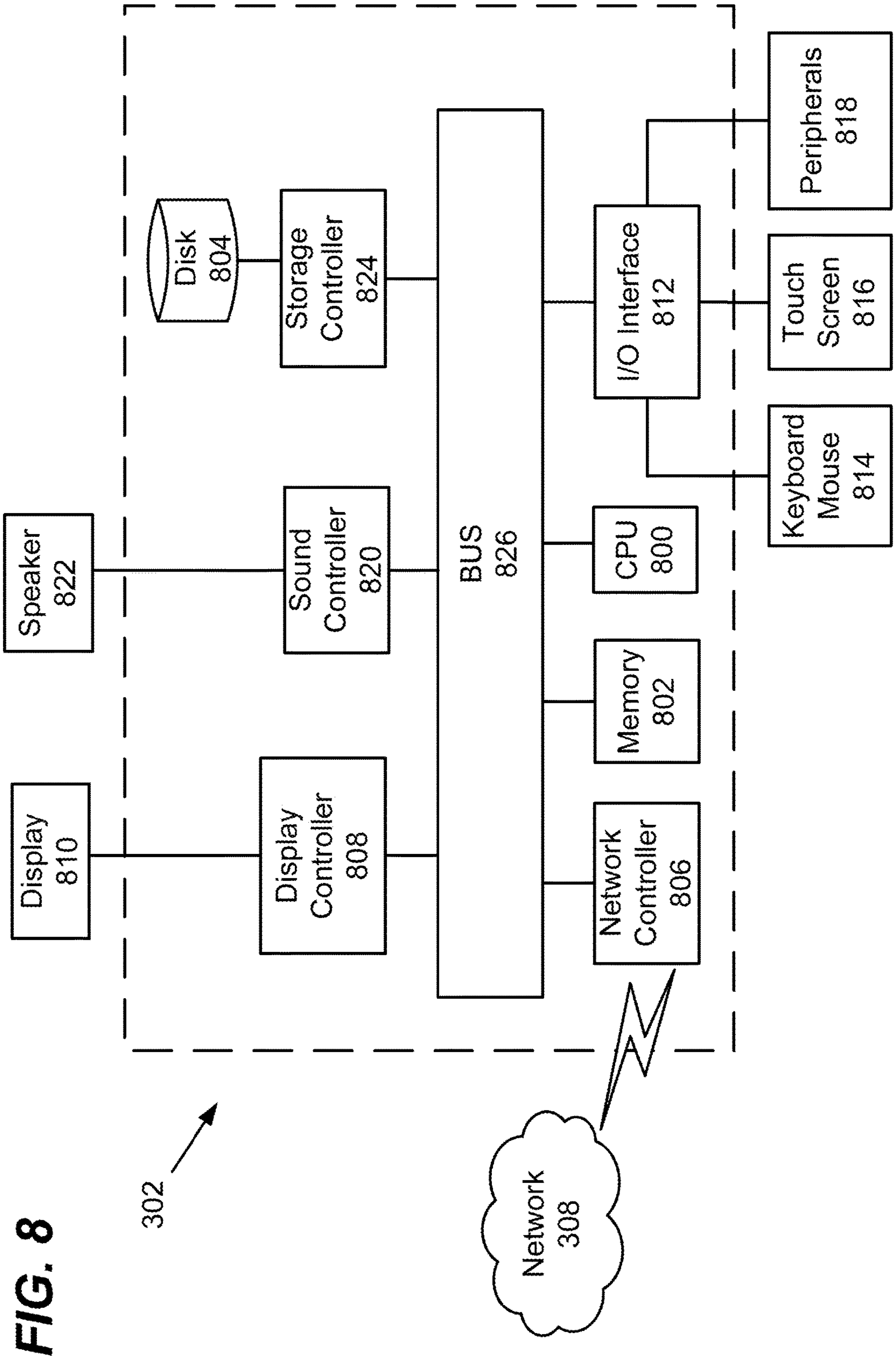
FIG. 8 illustrates a non-limiting hardware description of a server, according to certain embodiments.

A hardware description of the server 302 according to exemplary embodiments is described with reference to FIG. 8. In FIG. 8, the server 302 includes a CPU 800 which performs the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 302 communicates, such as a computer 306.

Further, the claimed advancements may be provided as a utility application, background daemon, or component of an operating system, or combination thereof, executing in conjunction with CPU 800 and an operating system such as Microsoft Windows 7, UNIX, Solaris, LINUX, Apple MAC-OS and other systems known to those skilled in the art.

The hardware elements in order to achieve the server 302 may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The server 302 in FIG. 8 also includes a network controller 806, such as an Intel Ethernet PRO network interface card from Intel Corporation of America, for interfacing with the network 308. As can be appreciated, the network 308 can be a public network, such as the Internet, or a private network such as an LAN or WAN network, or any combination thereof and can also include PSTN or ISDN subnetworks. The network 308 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 302 further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the server 302, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the server 302. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
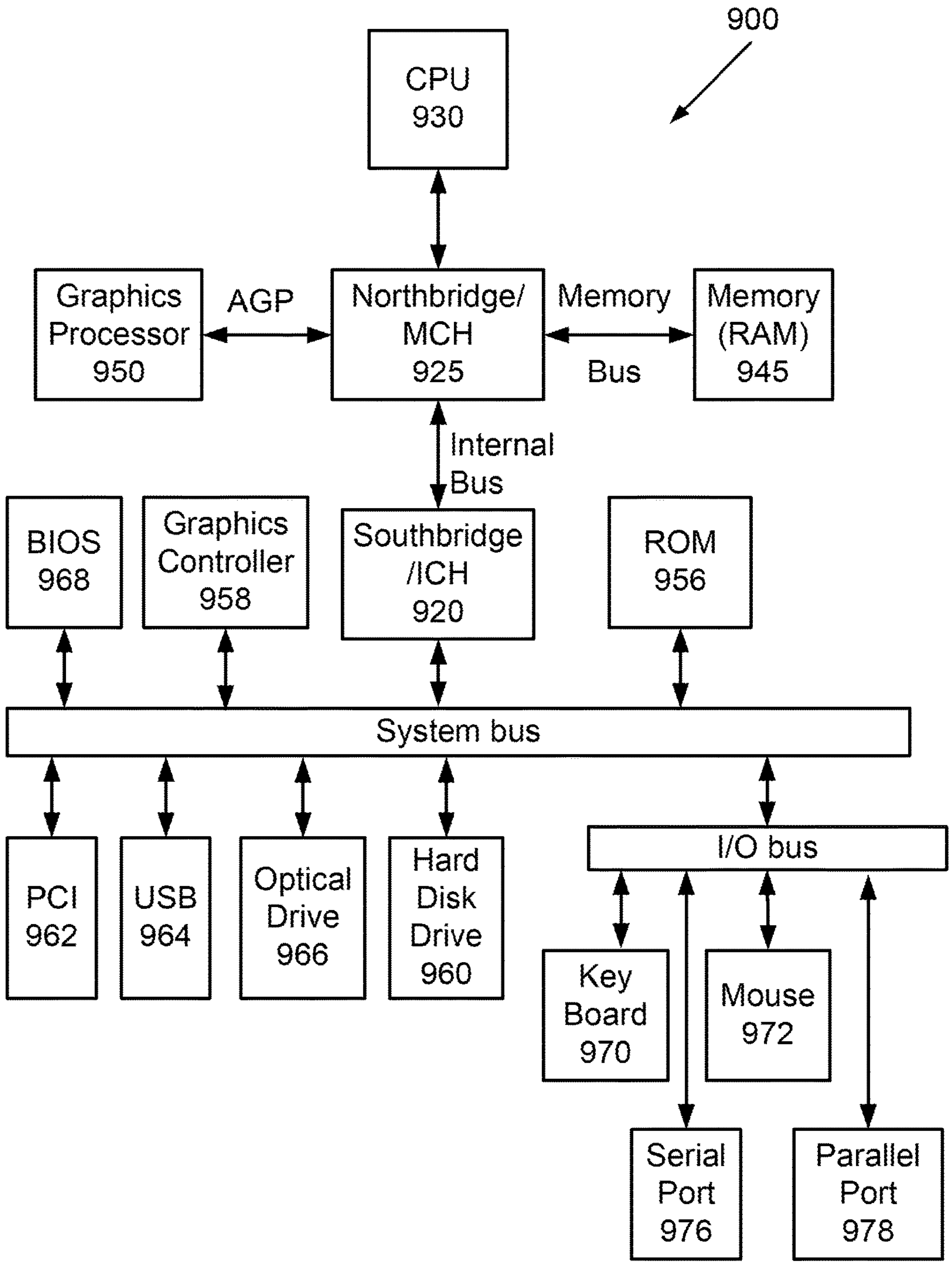
FIG. 9 illustrates a non-limiting hardware description of a data processing system, according to certain embodiments.

FIG. 9 shows a schematic diagram of a data processing system, according to certain embodiments, for performing people counting as described herein. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
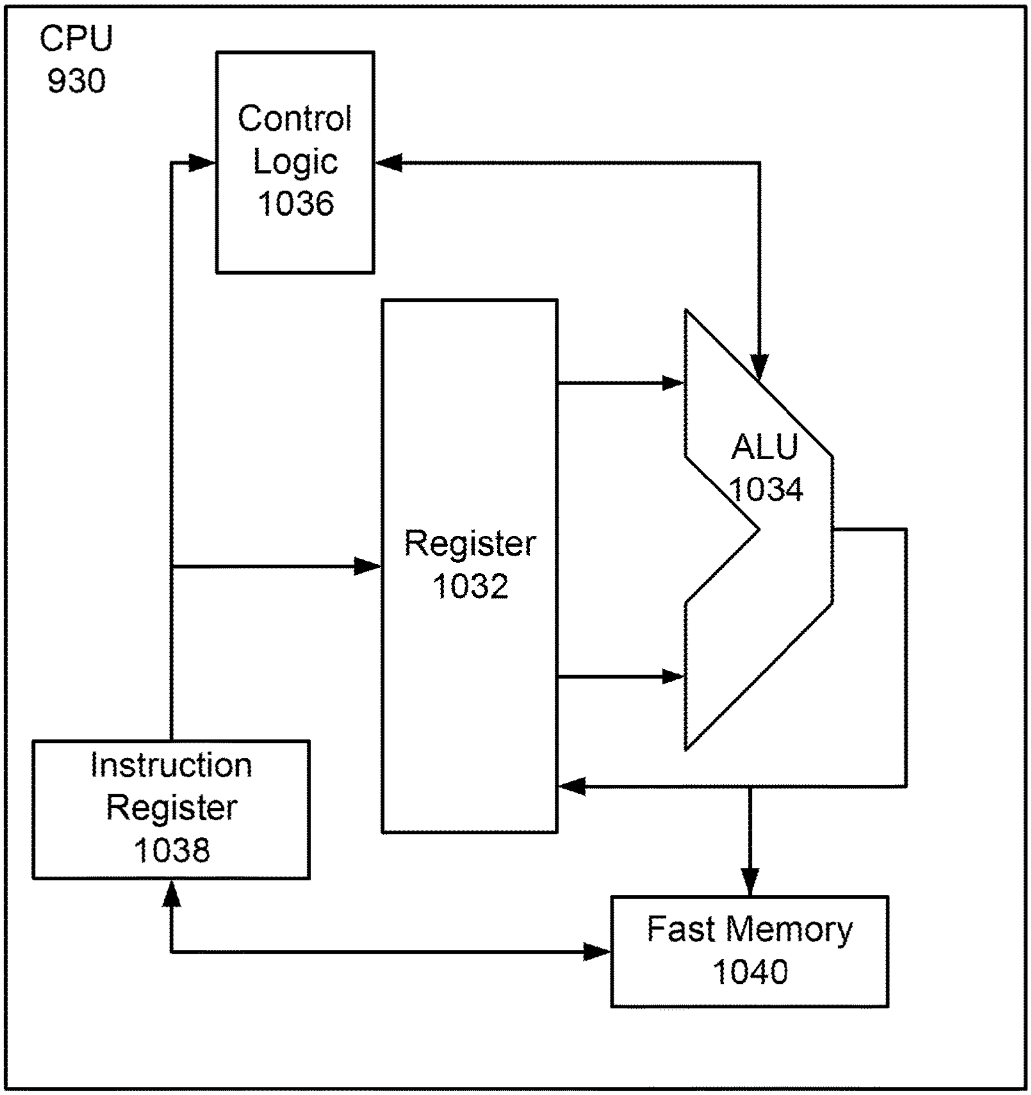
FIG. 10 illustrates a non-limiting hardware description of a CPU in a data processing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH YYY through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bust through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered. The above-described hardware description is a non-limiting example of corresponding structure for performing the functionality described herein.

The present disclosure includes both hardware and software components. Due to the nature of the application, physical contact detectors alone may not be able to perform accurate counting. For example, each being traversing across the counting apparatus 100 can have an undetected number of steps and motion patterns based on their own unique gait signature. Additionally, the size of the crowd can have a direct impact on the number and the spatiotemporal characteristics of the steps taken by the passing beings.

Therefore, the present disclosure utilizes a plurality of multi-sensor detectors 102 including at least one sensor for vertical range detection. The vertical range detection provides an additional dimension to supplement the correlation of the collected data with the physical contact data to determine the number of beings making contact with the counting apparatus 100. The software component provides at least one machine learning technique that is capable of determining such correlation via processing circuitry in at least one server 302 and providing an accurate estimation of the count.

Several outputs can be expected from the proposed system. Those outputs can cover different aspects beyond counting such as potential risk management, offered services, flow rates, crowd management etc. Therefore, the system can be applied in gathering places such as shopping malls, concert venues, airports, sporting events, conference rooms, classrooms and the like.

A number of implementations have been described. Nevertheless, it will be understood that various modifications may be made without departing from the spirit and scope of the present disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The above disclosure also encompasses the embodiments listed below.

(1) A counting system, including: a counting apparatus including a plurality of multi-sensor detectors configured to detect physical contact data and vertical range data corresponding to one or more steps across the multi-sensor detectors, and first circuitry configured to determine physical contact vectors and coordinate data from the physical contact data and the vertical range data; and at least one server including second circuitry configured to: receive the physical contact vectors and the coordinate data from the counting apparatus, determine footprint patterns and body patterns based on the physical contact vectors and the coordinate data, and estimate a number of beings passing over the counting apparatus based on the footprint patterns and the body patterns.

(2) The counting system of (1), wherein the plurality of multi-sensor detectors includes at least one LED sensor, at least one infrared transmitter, and at least one infrared receiver.

(3) The counting system of (1) or (2), wherein the at least one infrared transmitter is configured to transmit a beam in a direction away from the counting apparatus and the at least one infrared receiver receives a reflection of the beam emitted by the at least one infrared transmitter.

(4) The counting system of any one of (1) to (3), wherein the at least one LED sensor is configured to detect physical contact data and the at least one infrared transmitter and at least one infrared receiver is configured to detect the vertical range data.

(5) The counting system of any one of (1) to (4), wherein the second circuitry is further configured to determine the footprint patterns from the physical contact vectors detected by the multi-sensor detectors.

(6) The counting system of any one of (1) to (5), wherein the second circuitry is further configured to assign a timestamp to the footprint patterns corresponding to a time at which the corresponding physical contact vector was detected by the counting apparatus.

(7) The counting system of any one of (1) to (6), wherein the second circuitry is further configured to determine the size and direction of the footprint patterns based on the physical contact vectors and the coordinate data.

(8) The counting system of any one of (1) to (7), wherein the second circuitry is further configured to determine the body patterns from the footprint patterns and the coordinate data.

(9) The counting system of any one of (1) to (8), wherein the second circuitry is further configured to perform trend analysis of the body patterns and the footprint patterns.

(10) The counting system of any one of (1) to (9), wherein the second circuitry is further configured to determine one or more states associated with the footprint patterns and the body patterns including: a footprint pattern with a body pattern, multiple footprint patterns with a body pattern, a body pattern with no footprint patterns, and interfering body patterns with multiple footprint patterns.

(11) The counting system of any one of (1) to (10), wherein the second circuitry is further configured to estimate counts based on the one or more states of the footprint patterns and the body patterns.

(12) A method of counting, including: detecting, at a counting apparatus via a plurality of multi-sensor detectors, physical contact data and vertical range data corresponding to one or more steps across the multi-sensor detectors; determining, via first circuitry in the people counting apparatus, physical contact vectors and coordinate data based on the physical contact data and the vertical range data; receiving, via second circuitry in a server, the physical contact vectors and the coordinate data from the counting apparatus; determining, via the second circuitry, footprint patterns and body patterns based on the physical contact vectors and the coordinate; and estimating, via the second circuitry, a number of beings passing over the multi-sensor detectors.

(13) The method of (12), wherein the second circuitry is further configured to assign a timestamp to the footprint patterns corresponding to a time at which the corresponding physical contact vector was detected by the counting apparatus.

(14) The method of (12) or (13), wherein the second circuitry is further configured to determine the size and direction of the footprint patterns based on the physical contact vectors and the coordinate data.

(15) The method of any one of (12) to (14), wherein the second circuitry is further configured to perform trend analysis of the body patterns and the footprint patterns.

(16) The method of any one of (12) to (15), wherein the second circuitry is further configured to determine one or more states associated with the footprint patterns and the body patterns including: a footprint pattern with a body pattern, multiple footprint patterns with a body pattern, a body pattern with no footprint patterns, and interfering body patterns with multiple footprint patterns.

(17) The method of any one of (12) to (16), wherein the second circuitry is further configured to estimate counts based on the one or more states of the footprint patterns and the body patterns.

(18) A counting apparatus, including: a plurality of multi-sensor detectors configured to detect physical contact data and vertical range data corresponding to one or more steps across the multi-sensor detectors, and circuitry configured to determine physical contact vectors and coordinate data based on the physical contact data and the vertical range data.

(19) The counting apparatus of (18), wherein the plurality of multi-sensor detectors includes at least one of a LED sensor, at least one infrared transmitter, and at least one infrared receiver.

(20) The counting apparatus of (18) or (19), wherein the at least one LED sensor is configured to detect the physical contact data and the at least one infrared transmitter and the at least one infrared receiver is configured to detect the vertical range data.

The invention claimed is:

1. A counting system, comprising:

a counting apparatus including:

a plurality of multi-sensor detectors configured to detect physical contact data and vertical range data corresponding to one or more steps across the multi-sensor detectors, and first circuitry configured to determine physical contact vectors and coordinate data from the physical contact data and the vertical range data; and at least one server including second circuitry configured to:

receive the physical contact vectors and the coordinate data from the counting apparatus, determine footprint patterns and body patterns based on the physical contact vectors and the coordinate data, and estimate a number of beings passing over the counting apparatus based on the footprint patterns and the body patterns.

2. The counting system according to claim 1, wherein the plurality of multi-sensor detectors includes at least one LED sensor, at least one infrared transmitter, and at least one infrared receiver.

3. The counting system according to claim 2, wherein the at least one infrared transmitter is configured to transmit a beam in a direction away from the counting apparatus, and the at least one infrared receiver receives a reflection of the beam emitted by the at least one infrared transmitter.

4. The counting system according to claim 2, wherein the at least one LED sensor is configured to detect the physical contact data and the at least one infrared transmitter and the at least one infrared receiver is configured to detect the vertical range data.

5. The counting system according to claim 1, wherein the second circuitry is further configured to determine the footprint patterns from the physical contact vectors detected by the multi-sensor detectors.

6. The counting system according to claim 1, wherein the second circuitry is further configured to assign a timestamp to the footprint patterns corresponding to a time at which the corresponding physical contact vector was detected by the counting apparatus.

7. The counting system according to claim 1, wherein the second circuitry is further configured to determine the size and direction of the footprint patterns based on the physical contact vectors and the coordinate data.

8. The counting system according to claim 1, wherein the second circuitry is further configured to determine the body patterns from the footprint patterns and the coordinate data.

9. The counting system according to claim 1, wherein the second circuitry is further configured to perform trend analysis of the body patterns and the footprint patterns.

10. The counting system according to claim 1, wherein the second circuitry is further configured to determine one or more states associated with the footprint patterns and the body patterns including:

a footprint pattern with a body pattern,
multiple footprint patterns with a body pattern,
a body pattern with no footprint patterns, and
interfering body patterns with multiple footprint patterns.

11. The counting system according to claim 10, wherein the second circuitry is further configured to estimate counts based on the one or more states of the footprint patterns and the body patterns.

12. A method of counting, comprising:

detecting, at a counting apparatus via a plurality of multi-sensor detectors, physical contact data and vertical range data corresponding to one or more steps across the multi-sensor detectors;

determining, via first circuitry of the counting apparatus, physical contact vectors and coordinate data based on the physical contact data and the vertical range data;

receiving, via second circuitry in a server, the physical contact vectors and the coordinate data from the counting apparatus;

determining, via the second circuitry, footprint patterns and body patterns based on the physical contact vectors and the coordinate data; and estimating, via the second circuitry, a number of beings passing over the multi-sensor detectors.

13. The method of claim 12, wherein the second circuitry is further configured to assign a timestamp to the footprint patterns corresponding to a time at which the corresponding physical contact vector was detected by the counting apparatus.

14. The method of claim 12, wherein the second circuitry is further configured to determine the size and direction of the footprint patterns based on the physical contact vectors and the coordinate data.

15. The method of claim 12, wherein the second circuitry is further configured to perform trend analysis of the body patterns and the footprint patterns.

16. The method of claim 12, wherein the second circuitry is further configured to determine one or more states associated with the footprint patterns and the body patterns including:

a footprint pattern with a body pattern,
multiple footprint patterns with a body pattern,
a body pattern with no footprint patterns, and
interfering body patterns with multiple footprint patterns.

17. The method of claim 16, wherein the second circuitry is further configured to estimate counts based on the one or more states of the footprint patterns and the body patterns.

18. A counting apparatus, comprising:

a plurality of multi-sensor detectors configured to detect physical contact data and vertical range data corresponding to one or more steps across the multi-sensor detectors; and circuitry configured to determine physical contact vectors and coordinate data based on the physical contact data and vertical range data.

19. The counting apparatus of claim 18, wherein the plurality of multi-sensor detectors includes at least one LED sensor, at least one infrared transmitter, and at least one infrared receiver.

20. The counting apparatus of claim 19, wherein the at least one LED sensor is configured to detect the physical contact data and the at least one infrared transmitter and the at least one infrared receiver is configured to detect the vertical range data.

* * * * *